United States Patent [19]

Charlton

[11] 4,004,169
[45] Jan. 18, 1977

[54] HOLDER FOR ANCHORING LEADS TO DYNAMOELECTRIC MACHINES

[75] Inventor: Thomas Charlton, Lima, Ohio

[73] Assignee: Westinghouse Electric Corporation, Pittsburgh, Pa.

[22] Filed: Apr. 23, 1975

[21] Appl. No.: 570,891

[52] U.S. Cl. .............................................. 310/71
[51] Int. Cl.² ..................................... H02K 11/00
[58] Field of Search ............ 310/71, 194, 260, 214, 310/218, 189; 339/125, 126; 336/192, 107

[56] References Cited

UNITED STATES PATENTS

| 3,457,442 | 7/1969 | Charlton | 310/71 |
| 3,483,408 | 12/1969 | Frohmuller | 310/71 |
| 3,502,917 | 3/1970 | Bizoe | 310/71 |
| 3,518,616 | 6/1970 | Lewis | 310/71 |
| 3,725,707 | 4/1973 | Leimbach | 310/71 |

Primary Examiner—R. Skudy
Attorney, Agent, or Firm—G. H. Telfer

[57] ABSTRACT

An insulating holder with channels to receive and secure splice connectors joining conductors, each channel having a continuous band of material at its opening with a slotted band portion therebehind for permitting flexing upon entrance of a connector, and locking shoulders extending partially within the channel from the sides of the slot for preventing removal of a connector therefrom. The channel also has a retaining lip over the rear portion thereof to prevent upward displacement of a connector and the holder has a pair of legs for straddling and frictionally engaging a stator core tooth for mounting the holder on a core.

6 Claims, 4 Drawing Figures

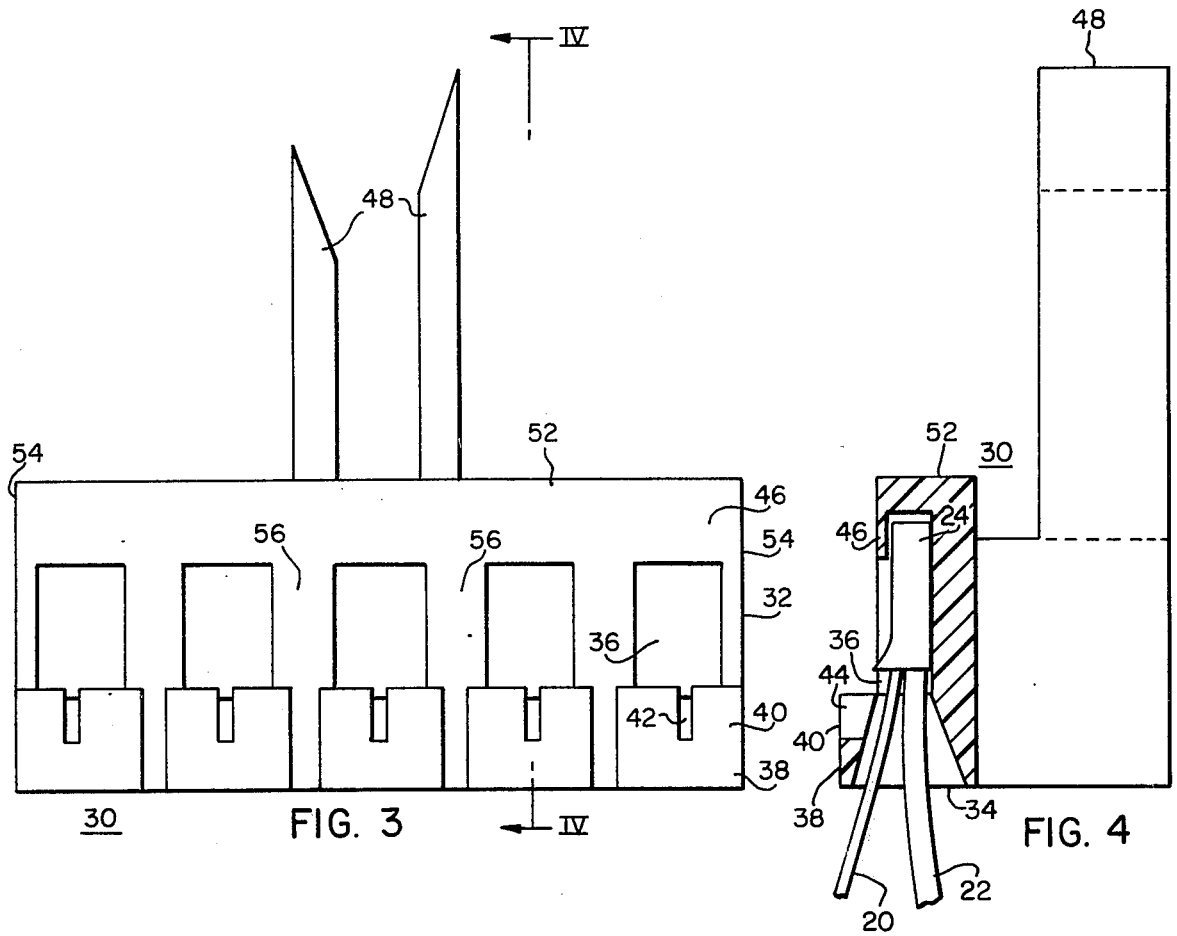
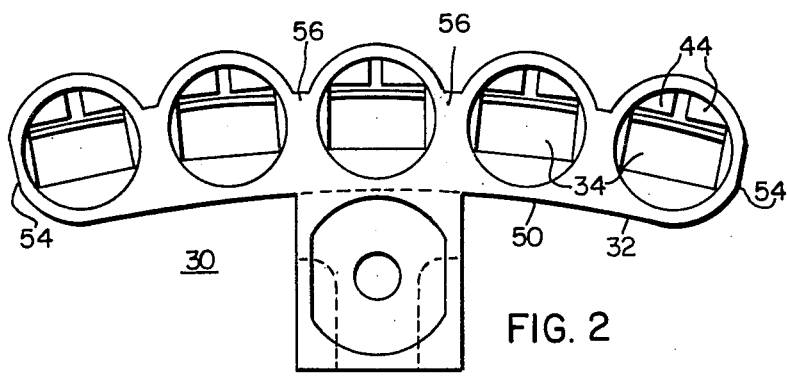

HOLDER FOR ANCHORING LEADS TO DYNAMOELECTRIC MACHINES

BACKGROUND OF THE INVENTION

It has been conventional practice in small or fractional horsepower motors for the stator winding to be secured by clamping or crimping it to a lead-in conductor with a metallic element. The metal connector is usually wrapped with an insulator and buried within the end turns of the stator winding. Sometimes such connectors become loose with resulting lack of good appearance and increased potential for damage. Such an assembly also requires labor and material costs that would be desirable to avoid. Reference is made to Charlton et al U.S. Pat. No. 3,457,442, July 22, 1969, for a further discussion of the problems relating to such connections and prior solutions.

In the Charlton et al patent there is disclosed an insulating holder or connecting block for securing the lead connection proximate to the stator core but without embedding the lead connection in the end turns. As is there shown the insulating holder, preferably molded as a unitary element of insulating material, has channels for receiving a metallic connector element and has legs straddling end turns to secure the holder thereto. Such a connector block has been successfully used but is susceptible of certain disadvantages.

One of the disadvantages of the connector block described in the Charlton et al patent is that the channels for receiving the wire connector are slotted at their opening for permitting flexure and facilitating the reception of the connector. However it is possible for an insulated conductor joined by the connector to be forced within the slot resulting in opening of the channel and the possibility that the connector itself will fall or be removed therefrom. Additionally, the tubular channels of the Charlton et al device included a retaining shoulder or ring extending within the channel from a surface thereof, referring to element 28 of the drawing of the aforementioned patent, with the result that in molding the unit this element was sometimes sheared from the molded part or was made too small to perform its intended function. Further difficulty was sometimes found in positioning the holder onto the end turns or in getting a secure fit thereon. For the foregoing reasons it was deemed desirable to improve generally the design and characteristics of the insulating holder.

SUMMARY OF THE INVENTION

In accordance with the present invention, an insulating holder is provided with channels to receive and secure splice connectors joining the end winding and lead-in conductors. Each of the channels has a continuous band portion of material at its opening with a slotted band portion therebehind for permitting flexing upon entrance of a connector. Locking shoulders extend partially within the channel from the sides of the slot for preventing removal of a connector therefrom. The channel also has a retaining lip over the rear portion thereof to prevent upward displacement of a connector. The holder may be secured by various means to a stator core. One means is a pair of legs, integral with and extending from the holder, for straddling and frictionally engaging a stator core tooth.

The new design has eliminated the problems or disadvantages of the design of the prior patent. In the new design the locking shoulder is at the parting line of the mold used in making it and is not subject to shear in withdrawal from the mold. The slot in the upper part of the band defining the channel does not extend all the way to the front of the tube. The solid band portion remaining prevents the lead wire from entering into the slot. The engagement of the legs of the holder with a stator core tooth results in it being securely in place without being dependent on the end turns.

BRIEF DESCRIPTION OF THE DRAWING

FIG. 2 is a front elevation view of the holder of FIG. 1;

FIG. 3 is a top view of the holder in accordance with this invention, and

FIG. 4 is a sectional view taken along line IV—IV of FIG. 2 with a wire connector in place.

DESCRIPTION OF THE PREFERRED EMBODIMENT

Figure 1:
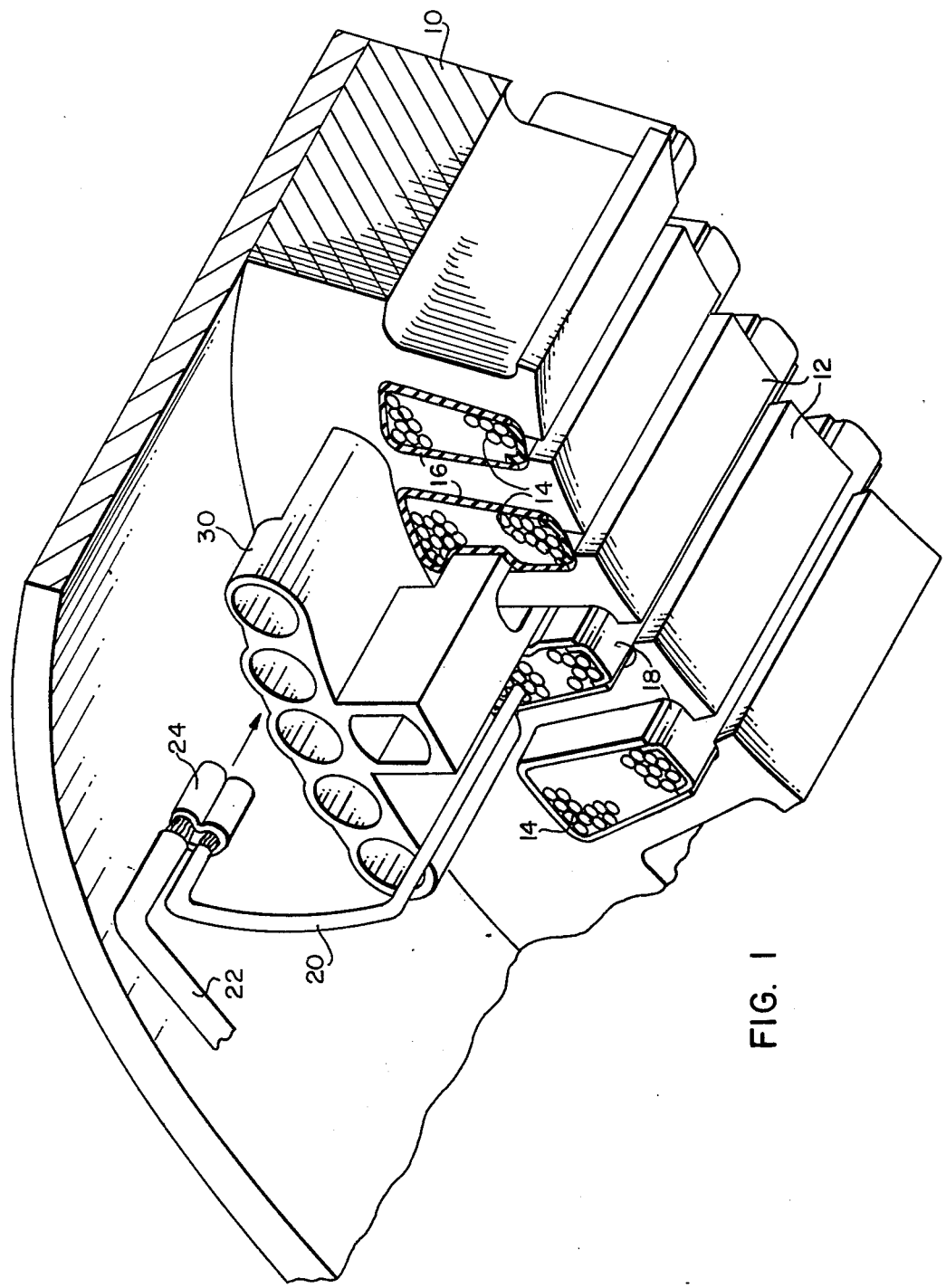
FIG. 1 is a perspective view of an insulating holder for lead connectors in accordance with one embodiment of the present invention with the holder disposed on a wound stator core.

Referring to FIG. 1, there is shown a partial perspective view of a wound stator for a dynamoelectric machine, such as a single phase induction motor in the fractional horsepower range. This stator includes a core 10 conventionally fabricated from a plurality of laminated magnetic sheets of material. The core 10 includes a plurality of angularly spaced apart teeth 12 whose inner surfaces define a rotor receiving bore. Slots for accommodating windings 14 are formed between the stator teeth 12.

The windings 14 are formed by a number of turns of insulated magnet wire, the winding being further insulated from the core and the core teeth within the slots by insulating slot liners 16 and slot wedges 18. The windings 14 and certain of the slot insulators 16 are illustrated cut back to permit better illustration of the elements of this invention. The windings 14 normally extend beyond the ends of the core 10 to form loops or end turns that are bent back near or against the ends of the core.

In order to supply power to the windings a suitable connection is made between an end 20 of the above-mentioned magnet wire in the core and an insulated lead-in conductor 22. While only one such connection is shown for illustration, a typical machine will have a plurality of such connections. The conductors 20 and 22 (sometimes an additional winding conductor is joined) may be variously joined by soldering or crimping within a metallic connector 24 whose particular nature is not essential to the practice of this invention except that it is characterized by having a rearward edge of larger dimensions than the conductors themselves.

FIG. 1 shows an insulating holder 30 for supporting and anchoring the metallic connection member 24 that joins the insulated wire conductor 20 of the stator winding and the lead-in conductor 22 in position on the stator core 10. The holder is shown in further detail in the other figures.

The holder 30 comprises insulating material that is preferably molded as a unitary element. A thermoplastic material is suitable and is preferable to a thermosetting material to avoid brittleness. Polycarbonate and polysulphone are examples of suitable material.

The holder 30 includes a body 32 with a plurality of openings 34 in it for receiving the connector 24. The openings 34 lead into channels 36 with each of the openings being defined by a closed band of material 38 at the entrance thereto. The closed band 38 is integral with a rearward, like dimensioned, band 40 that has a slot 42 from its back surface partially therethrough at the top of the band 40. The slotted band 40 terminates with a pair of locking shoulders 44 extending transversely partially across the channel 36 for anchoring in place the connection member 24.

Upon insertion of a connection member 24 it is permitted to be forced past the locking shoulders 44 by the flexibility afforded by the slot 42 and is prevented from withdrawal by pressure against the rearward surface thereof upon occurrence of a force tending to pull the conductors and the connection member 24 from the opening 34.

The holder 30 also includes a retainer lip 46 that is spaced from the locking shoulders and extends over a part of a connector member 24 to prevent displacement thereof in directions transverse to the opening.

Additionally, the holder 30 includes integrally molded means for securing it to the stator core which in accordance with the illustrated form of the invention comprises a pair of legs 48 for extending into the core and straddling a core tooth 12 so that it is retained in that position by frictional engagement of the legs with the surfaces of the tooth.

As can be seen from the drawing the insulating holder 30 has a bottom wall 50 and a rear wall 52 that are substantially continuous. The orientations as depicted in FIG. 1 are used for purposes of reference as to front, rear, top and bottom.

A pair of side walls 54 and a plurality of, or at least one, intermediate spacer 56 run from the front of the bottom surface 50 proximate to the rear surface 52 or entirely to the rear surface as illustrated. The side walls 54 and 56 spacers are substantially parallel and define between them the plurality of channels 36 for disposition in each, as needed, of a connection member. The bands 38 of material defining the openings 34 to the channels 36 is essentially a cylindrical tube continuous at the opening. It is integral with a rearward band portion 40 which is slotted and does not extend as far back as the channel itself, i.e., part of each channel is uncovered. The locking shoulders 44 extend from the upper portion of the band portion 40 at the rear of it on each side of the slot 42 and partially obstruct the channel 36. The remainder of the channel 36 is of essentially rectangular cross section with no upper surface except at the rearward part where the retaining lip 46 extends from the rear wall 52 so as to limit the displacement of the connector member 24. The particular arrangement shown is especially suitable for connector members that have a substantially flat, rectangular configuration as shown in FIGS. 1 and 4. For connector members of different configuration the channel configuration could be tailored to their purpose.

The present invention is not limited to the particular means shown for securing the holder 30 to the stator core 10. It is preferable that the holder be secured to the core rather than the end turns of the winding and the form shown is one suitable for that purpose. Alternate means are to provide a hole of suitable configuration in the core 10 itself and have a mating shape or projection of the holder that could be fitted securely in this hole.

As can be seen the disposition of the locking shoulders 44 at the rearward portion of the tubular configuration (bands 38 and 40) in the initial part of the channels enables those locking shoulders to be molded readily without danger of having them sheared upon disassembly of the mold. Additionally, the provision of the slot 42 from the rear of the tubular portion provides sufficient flexing in order to permit insertion of the connector but does not provide an unwanted slot at the beginning of the band 38 where a conductor could become lodged with resulting forcing apart of the channel and loosening of a connector.

It is believed the present invention succeeds in providing the purposes sought in improving over the holder of the aforementioned Charlton et al patent and yet remains economical to make and use as opposed to the practice of wrapping the connector and embedding it in the winding end turns. Within the principles of the invention it will be seen that various particular embodiments may be formed in addition to that shown.

What is claimed is:

1. In a dynamoelectric machine having a stator core with a plurality of teeth between which are supported insulated conductors forming a stator winding, the improvement comprising:

an insulating holder for supporting and anchoring a metallic connection member that joins the insulated wire conductor of the stator winding and a lead-in conductor;

said holder including a body with a plurality of openings therein, each of said openings being defined by a closed band of material at the entrance thereto and a slotted band of material adjacent said closed band, said slotted band terminating with a locking shoulder extending transversely into said opening for anchoring in place said connection member by pressure against the rearward surface thereof upon occurrence of a force tending to pull said conductors and connection member from said opening;

and means for securing said holder directly to the stator core.

2. The subject matter of claim 1 wherein said holder further includes a retainer lip spaced from said locking shoulder and extending over a part of a connector member to prevent displacement thereof in directions transverse to the opening.

3. The subject matter of claim 1 wherein: said means for securing said holder to the stator core comprises a pair of legs frictionally engaging opposing surfaces of a stator core tooth.

4. An insulating holder for supporting and anchoring a metallic connection member that joins an insulated wire conductor of a dynamoelectric machine stator winding and a lead-in conductor, said holder being a unitary member of molded-insulating material and comprising:

a bottom wall and a rear wall that are substantially continuous;

a pair of side walls and at least one intermediate spacer running from the front of said bottom wall proximate to said rear wall, said side walls and spacer being substantially parallel and defining therebetween a plurality of channels for disposition in each of a connection member;

a continuous band of material at the front of each of said channels defining the opening thereto, said band of material being continuous at the front and having a slot extending from the rear thereof toward the front;

a pair of locking shoulders extending from the upper portion of said band at the rear of said band at the sides of said slot and partially obstructing said channel;

said band slot being to permit flexing of said band to permit a connection member to be forced past said locking shoulders and not be withdrawn therefrom; and means for securing said holder directly to a stator core.

5. The subject matter of claim 4 wherein: said holder also comprises a retaining lip over a portion of each channel extending frontwardly from said rear wall for preventing upward displacement of a connection member.

6. The subject matter of claim 4 wherein: said means for securing said holder to a stator core comprises a pair of legs for frictionally engaging opposing surfaces of a stator core tooth, said legs being attached to the underside of said bottom surface and extending in the direction of said channels past the location of said rear wall surface so when in place said rear wall abuts the core end surface.

* * * * *